United States Patent
Gollahon

(12)
(10) Patent No.: US 6,435,614 B1
(45) Date of Patent: Aug. 20, 2002

(54) FISHING POLE HARNESS/CHAIR SUPPORT APPARATUS

(76) Inventor: Robert Gollahon, 2340 Kings Hwy., King George, VA (US) 22485

( * ) Notice: Subject to any disclaimer, the term of this patent is extended or adjusted under 35 U.S.C. 154(b) by 0 days.

(21) Appl. No.: 09/711,130

(22) Filed: Nov. 14, 2000

Related U.S. Application Data

(63) Continuation-in-part of application No. 09/280,077, filed on Mar. 29, 1999, now Pat. No. 6,145,929.

(51) Int. Cl.⁷ .......................... A47C 1/023; A62B 35/00
(52) U.S. Cl. .............................. 297/344.1; 297/344.11; 297/440.15; 297/440.16; 297/188.01; 297/468; 297/485; 248/393; 248/424; 248/429
(58) Field of Search .................. 297/344.1, 344.11, 297/440.15, 440.16, 468, 485, 188.01; 248/424, 429, 393

(56) References Cited

U.S. PATENT DOCUMENTS

| | | | | |
|---|---|---|---|---|
| 1,298,615 A | * | 3/1919 | Wilkinson | 297/485 X |
| 1,316,163 A | * | 9/1919 | Kennedy | 297/485 X |
| 1,642,911 A | * | 9/1927 | Thurnau | 297/468 X |
| 2,437,585 A | * | 3/1948 | Zimmern | 297/468 |
| 2,909,215 A | * | 10/1959 | Mitchell | 297/188.01 X |
| 2,960,180 A | * | 11/1960 | Wachtel | 297/468 X |
| 3,151,910 A | * | 10/1964 | Larson | |
| 3,851,916 A | * | 12/1974 | Quartullo | |
| 4,086,676 A | * | 5/1978 | Arruza | 248/429 X |
| 4,460,216 A | * | 7/1984 | Keller | 297/188.01 |
| 4,722,567 A | * | 2/1988 | Hashihara | 297/188.01 X |
| 4,879,963 A | * | 11/1989 | Dionne | |
| 5,664,844 A | * | 9/1997 | Greene | 297/485 |
| 5,899,527 A | * | 5/1999 | Elvidge et al. | 297/188.01 X |
| 6,145,929 A | * | 11/2000 | Gollahon | 297/344.11 X |
| 6,203,103 B1 | * | 3/2001 | Presson | 297/188.01 |

FOREIGN PATENT DOCUMENTS

DE 3708300 * 10/1988 ................. 297/468

* cited by examiner

Primary Examiner—Rodney B. White
(74) Attorney, Agent, or Firm—William L Klima; Law Offices of William L Klima, PC

(57) ABSTRACT

A fishing pole support apparatus for connecting a user to a fishing pole to support and control the fishing pole.

22 Claims, 7 Drawing Sheets

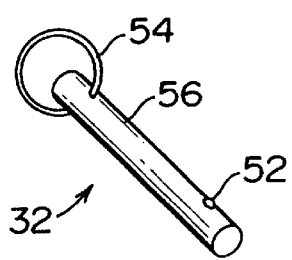
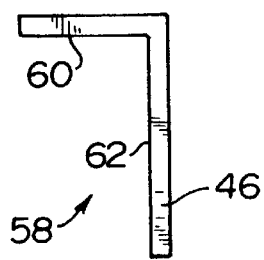
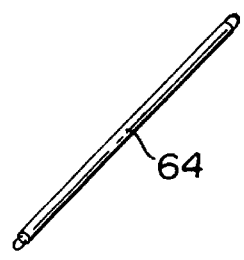
FIG. 5     FIG. 6     FIG. 7
FIG. 9
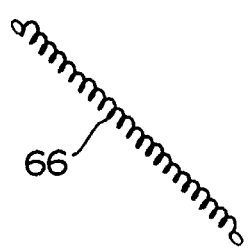
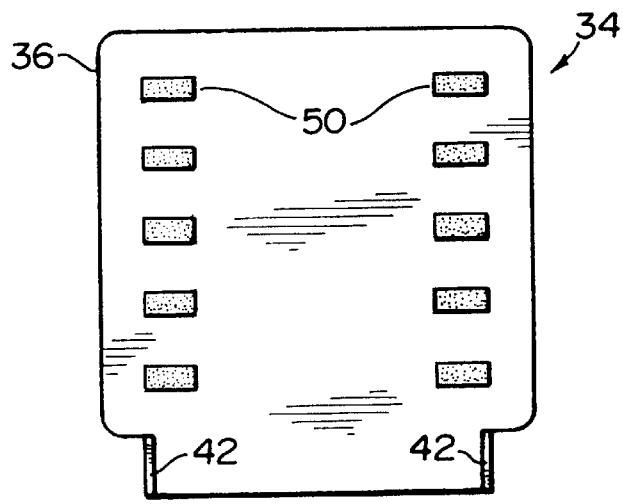
FIG. 8
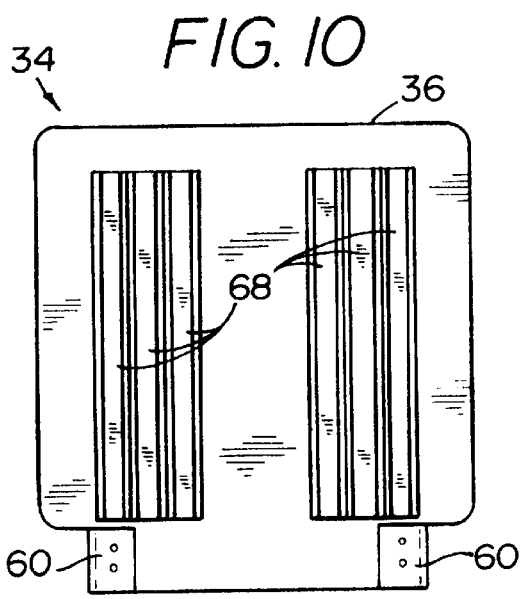
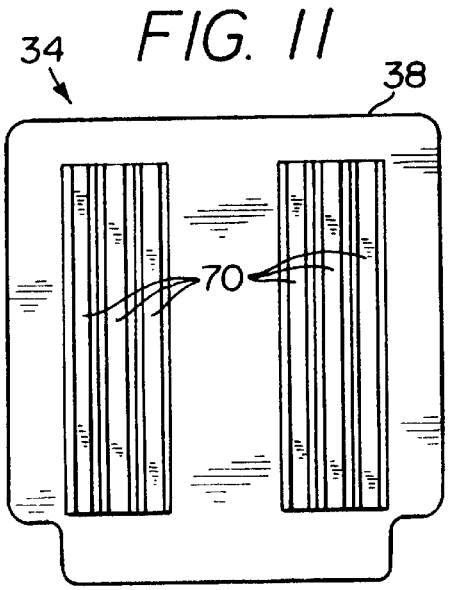
FIG. 10     FIG. 11

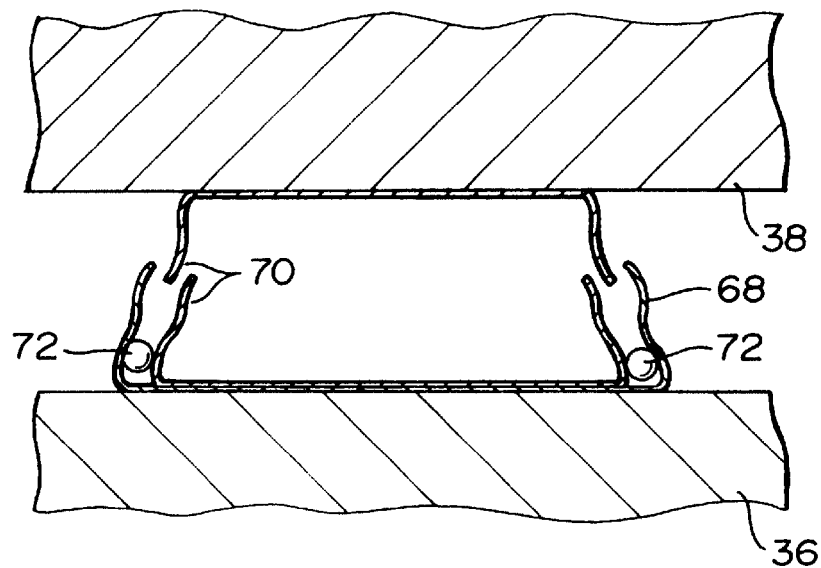
FIG. 12
FIG. 13
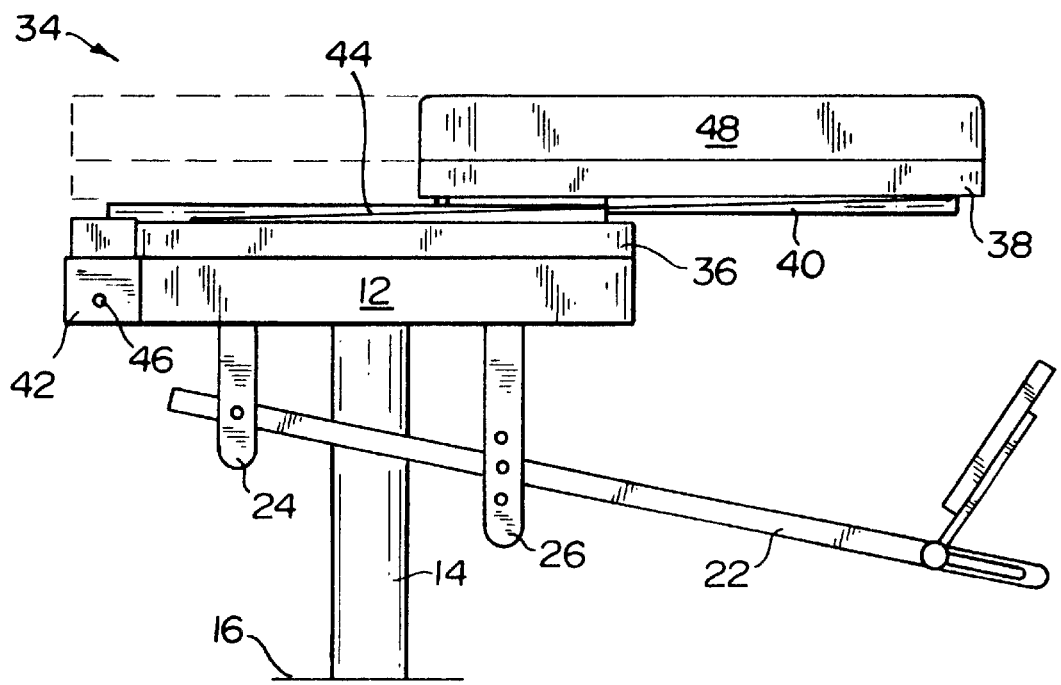

FISHING POLE HARNESS/CHAIR SUPPORT APPARATUS

RELATED APPLICATION

This is a continuation-in-part application of U.S. patent application now U.S. Pat. No. 6,145,929 "Sliding Insert for a Fishing Chair", Ser. No. 09/280,077, filed on Mar. 29, 1999, fully incorporated herein by reference.

FIELD OF THE INVENTION

The present invention is directed to a fishing pole harness/chair support apparatus configured for connecting a fishing pole to a user/chair for supporting and controlling the fishing pole.

BACKGROUND OF THE INVENTION

When fishing for large game fish such as blue marlin, black marlin, bluefin tuna and the like, it is customary for the fisherman to sit in a so-called fishing chair mounted on the aft deck of a power boat. The conventional fishing chair has an upstanding back rest and a seat both of which are mounted to pivot about an upright axis on a pedestal mounted to the boat deck. A foot rest extends outwardly from the seat portion of the chair to enable the fisherman to brace himself while landing a fish. A rod holder is mounted to the front of the chair for receiving the butt end of a fishing rod between the fisherman's legs. The rod holder is designed to pivot about a horizontal axis so that the fisherman may work the rod and reel back and forth while reeling in a fish.

Customarily, the fisherman sits in a bucket-type harness which is attached to the reel, and he usually uses his left hand to pump the rod. A lubricant such as a soap solution is squirted on the chair seat to enable the fisherman and his bucket-type harness to slide on the fishing chair; however, this is unsatisfactory for the following reasons: (1) It requires the aid of an assistant to supply lubricant; (2) It creates an unsafe condition if lubricant works off the edge of the seat and spills onto the deck; (3) Due to variation in the amount of friction between the bucket harness and the seat, a smooth back and forth motion is often lost; and (4) The bucket-type harness often works off the buttocks of the fisherman and moves up his back.

Landing one of the aforementioned game fish species is a strenuous and time-consuming endeavor. Depending upon the size of the fish, it is not uncommon for even a muscular fisherman to spend 4 to 8 hours in landing the fish. Customarily, the fisherman employs his arms, shoulders and back muscles to pivot the rod rearwardly into an upright position, and while lowering the rod, he reels rapidly to maintain tension on the line while simultaneously shortening it. This procedure is effective; however, it has a tendency to overstress certain of the body muscles and to induce fatigue. The typical fighting chair, when used with a bucket harness, does not allow for a cushion seat and therefore often causes early fatigue, muscle cramps and buttocks and leg sleep and/or numbness. A fishing chair which enables a fisherman to shorten the time required to land a game fish and/or to land a game fish with less muscle strain is highly desirable.

An auxiliary seat assembly for a sport fishing chair is known from U.S. Pat. No. 4,086,676 issued on May 2, 1978 to Arruza, which patent is hereby expressly incorporated by reference. The Arruza patent is an improvement over using a soap solution as a lubricant between the seat harness and the seat of the fishing chair. However, there are several disadvantages to using the auxiliary seat assembly of Arruza.

First, Arruza shows the auxiliary seat assembly attached to the fishing chair using screws or bolts. The use of screws or bolts is undesirable because the holes in the fishing chair ruin the appearance of the fishing chair when the auxiliary seat assembly is removed. A fishing chair may cost $8,000 to $10,000 and is in the class of a piece of fine furniture. It is very undesirable to ruin such an expensive item by boring holes in it. Additionally, the holes allow fresh and salt water to penetrate into the interior of the fishing chair wood, thereby causing deterioration of the chair.

Second, the Arruza device is made of wood, which is easily damaged by the marine environment of hot and cold temperatures and fresh and salt water. As the wood deteriorates, it becomes structurally inferior and can cause the sliding motion of the auxiliary seat assembly to bind or lock up completely.

Third, the sliding system of Arruza includes rails made of metal and guide elements made of nylon. Because the rail and guide materials are different, with different coefficients of thermal expansion, the extremes of heat and cold encountered in the marine environment can cause the rail and guide system to bind or lock up.

Fourth, the device of Arruza lacks an automatic return mechanism to return the top portion of the seat assembly to a retracted position from an extended position. When the seat assembly of Arruza is extended and the fisherman is pulled upward off the seat by a large fish, the seat assembly remains in the extended position. Often when the fisherman is pulling backward on the fish, the fisherman will fall back rather quickly to his starting position onto the seat assembly rather than sliding back with his full body weight on the chair. This is due to the weight and pull of the fish acting thru the counter leverage of the rod assembly holding the fisherman's weight up off the seat while the fisherman is moving in the backward position. In the Arruza device, if the fisherman has not manually returned the top portion to the retracted position, the fisherman will land with his buttocks on the exposed guide and rail system. The fisherman at a minimum will experience discomfort, and may injure himself, especially after repeated episodes.

Fifth, the top surface of the top portion of the Arruza device is simply a flat wood surface. As discussed above, eight hours or more may elapse before a fish is landed. Sitting on a hard wood surface for such a long period of time is at best uncomfortable and possibly intolerable. The plain wood surface is particularly undesirable if the fish is strong enough to raise the fisherman from the seat so that when the fisherman pulls back on the fish he or she returns to the seat almost in a free-fall style, as previously discussed. These quick transitions from standing to sitting are jarring to the body when the seat surface is hard, such as wood.

SUMMARY OF THE INVENTION

A first object of the present invention to provide an apparatus for use with a fishing chair that allows a fisherman to slide back and forth with respect to the seat of the fishing chair.

A second object of the present invention to provide a sliding insert for a fishing chair that overcomes the shortcomings of the prior art.

A third object of the present invention to provide a sliding insert that can be attached and removed from a fishing chair without damaging the appearance or weather tight integrity of the fishing chair.

A fourth object of the present invention to provide a sliding insert for a fishing chair that can withstand the marine environment.

A fifth object of the present invention to provide a sliding insert for a fishing chair having a bearing assembly that functions well in extremes of hot and cold and when exposed to fresh and/or salt water.

A sixth object of the present invention is to provide a sliding insert for a fishing chair that automatically returns from an extended position to a retracted position.

A seventh object of the present invention to provide a sliding insert for a fishing chair that includes a comfortable seating surface.

An eighth object of the present invention is to provide a fishing pole support apparatus configured for connecting a fishing pole to a user for supporting and controlling the fishing pole, the apparatus comprising a waist belt configured to fit around a waist of the user, a pair of first fasteners connected on opposite sides of the waist belt, a pair of leg belts connected to opposite sides of the waist belt, the leg belts each configured to fit around an upper portion of each leg of the user, and a pair of adjustable length second fasteners each connected to a respective the first fasteners, the adjustable length second fasteners configured to be releasably connected to the fishing pole.

A ninth object of the present invention is to provide a fishing pole support apparatus configured for connecting a fishing pole to a user for supporting and controlling the fishing pole, the apparatus comprising a harness device configured to connect with a body portion of the user, a pair of first fasteners connected on opposite sides of the harness device, and a pair of adjustable length second fasteners each connected to a respective the first fasteners, the adjustable length second fasteners configured to be releasably connected to the fishing pole.

These and other objects of the present invention are achieved by a sliding insert for a fishing chair comprising a bottom portion; a top portion; a bearing assembly located between the bottom and top portions such that the top portion is slidable relative to the bottom portion; and a first holding plate located on a rear end of the bottom portion for attaching the bottom portion to the fishing chair by inserting the first holding plate in a backrest support located on a rear of a seat of the fishing chair.

The sliding insert may further comprise a second holding plate located on the rear end of the bottom portion for attaching the bottom portion to the fishing chair by inserting the second holding plate in a backrest support, the second holding plate being located on a side of the bottom portion opposite the first holding plate.

The holding plates may each have a hole formed therein, the sliding insert further comprising a pair of fasteners for fastening each holding plate to its respective backrest support.

Preferably, the sliding insert further comprises a cushion attached to the top portion. The cushion is advantageously made of closed cell foam.

In a preferred embodiment, the top and bottom portions of the sliding insert comprise a plastic material.

Preferably, the sliding insert further comprises a retractor attached to the top and bottom portions for automatically returning the top portion from an extended position to a retracted position.

Another aspect of the invention is, in combination with a fishing chair having a seat including a pair of backrest supports attached to a rear of the seat, a sliding insert comprising a bottom portion; a top portion; a bearing assembly located between the bottom and top portions such that the top portion is slidable relative to the bottom portion; and a first holding plate located on a rear end of the bottom portion for attaching the bottom portion to the fishing chair, the first holding plate being inserted in one of the backrest supports.

The combination may further comprise a second holding plate located on the rear end of the bottom portion for attaching the bottom portion to the fishing chair, the second holding plate being located on a side of the bottom portion opposite the first holding plate and being inserted in the other of the backrest supports.

The present invention is also directed to a fishing pole harness/chair support apparatus configured for connecting a fishing pole to a user/chair for supporting and controlling the fishing pole. Preferably, the fishing pole support apparatus according to the present invention includes a body harness configured to connect with a portion of a user's body and connecting with the fishing pole so that there exists an actual connection between the user's body and the fishing pole.

The harness device can have various embodiments including a waist belt or a belt portion connected to a seat portion in different embodiments. In any event, it is preferable that the harness device connects near or adjacent an upper portion of the legs and/or lower portion of the back of the user (e.g. around the waist or seat) to allow a user to use his or her strength and weight in supporting and controlling the fishing pole, especially during large game fishing. This allow a user to maximize his or her strength in fighting a large game fish, and reducing the fatigue of a long battle with a game fish time wise.

Another important feature is that the harness device is connected to the fishing pole, preferably to the reel of the fishing pole, typically provided with eyelets for such a connection. Preferably, adjustable length fasteners (e.g. adjustable length rope or straps) connects the harness device to the fishing pole so that the length of the adjustable length fasteners can be adjusted by the user easily during use and operation.

Further objects, features and advantages of the present invention will become apparent from the following detailed description taken in conjunction with the accompanying drawing.

BRIEF DESCRIPTION OF THE DRAWINGS

FIG. 5 is a perspective view of a clip pin for use in the present invention.

FIG. 6 is an end view of a substantially right angle bracket for use in the present invention.

FIG. 7 is a perspective view of an elastic cord for use in the present invention.

FIG. 8 is a perspective view of a spring for use in the present invention.

FIG. 9 is a bottom planar view of the bottom portion of the sliding insert of the present invention.

FIG. 10 is a top planar view of the bottom portion of the sliding insert of the present invention.

FIG. 11 is a bottom planar view of the top portion of the sliding insert of the present invention.

FIG. 12 is an enlarged fragmentary vertical view of the slide used in the sliding insert of the present invention.

FIG. 13 is a side elevational view of the sliding insert of the present invention installed on a fishing chair.

DETAILED DESCRIPTION OF PREFERRED EMBODIMENTS

Figure 1:
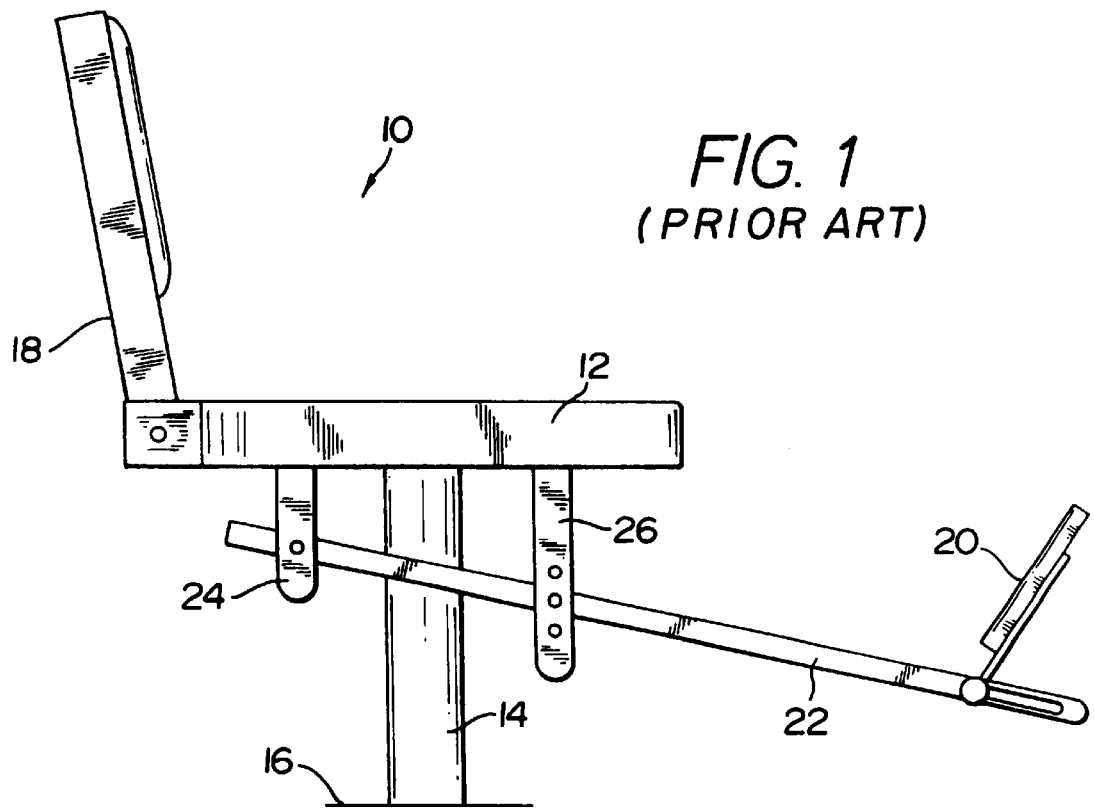
FIG. 1 is a side view of an exemplary conventional fishing chair.

FIG. 1 is a side view of an example of a conventional fishing chair 10. The fishing chair 10 includes a seat 12 mounted to pivot about a vertical axis on a pedestal 14 which is mounted at its lower end to the aft deck 16 of a boat. The fishing chair 10 has a backrest 18 mounted at its lower end to the rear of the chair seat 12. Arm rests (not shown) may be mounted on each side of the chair seat 12. A footrest 20 is located in front of the chair seat 12. The footrest 20 is adjustably secured to the seat 12 by a pair of struts, such as the strut 22, which is releasably connected to a pair of stanchions 24 and 26 depending from the under side of the seat 12. A rod holder or gimbal (not shown) is mounted to pivot about a horizontal axis at the front center of the seat 12. The rod holder receives the butt end of a fishing rod and enables the rod to pivot back and forth. A conventional harness assembly (not shown) straps around the lower portion of a fisherman's body and is connected to the reel.

Figure 2:
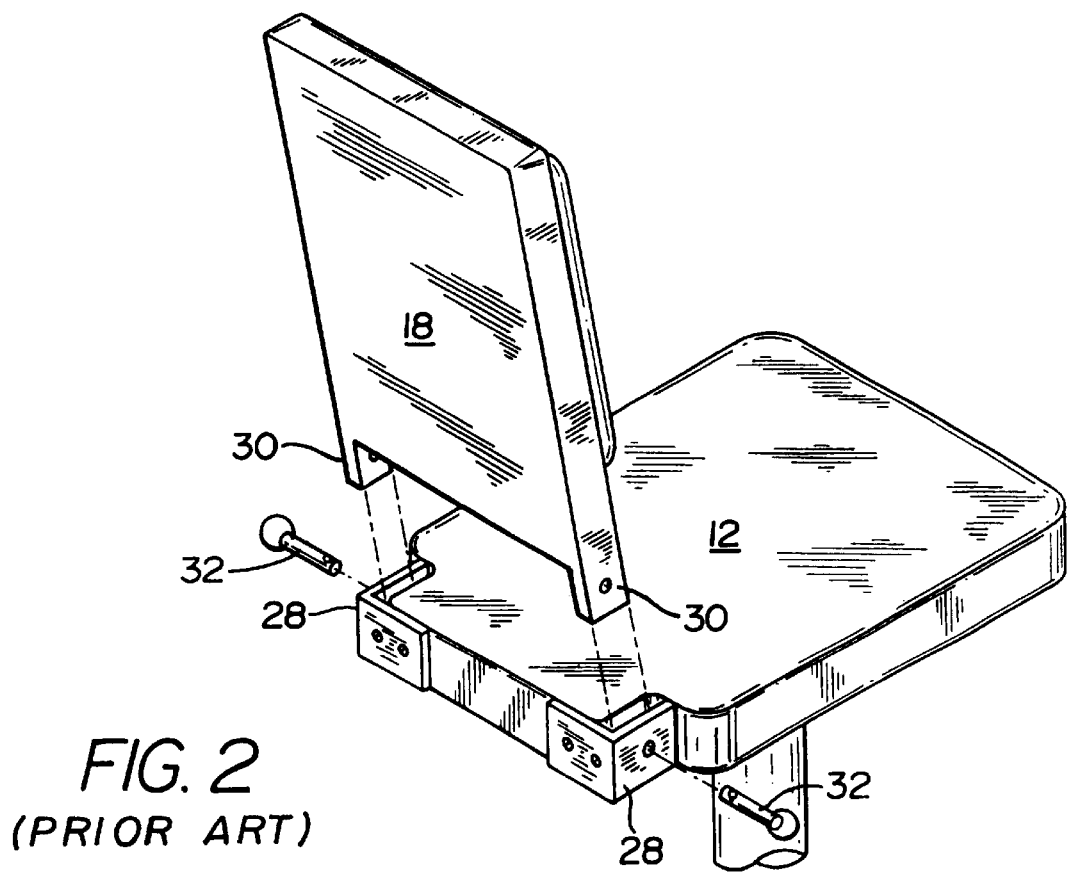
FIG. 2 is a perspective view showing the connection between the backrest and the seat of the chair of FIG. 1.

FIG. 2 shows how the backrest 18 is removably attached to the seat 12 of the fishing chair 10. A pair of backrest supports 28 are attached to the rear of the seat 12. The backrest supports 28 define an opening into which the backrest plates 30 are inserted. A pair of clip pins 32 or other type of fastener are placed through holes in the backrest supports 28 and in the backrest plates 30 thereby fastening the backrest 18 to the seat 12.

FIG. 5 shows a typical clip pin 32. The clip pin 32 includes a ring 54 for pulling the clip pin 32, a shaft 56 and a spring-loaded ball 52. When the clip pin 32 is inserted through a hole, the spring-loaded ball 52 depresses into the shaft 56 to allow passage of the pin through the hole. After the pin 32 is completely inserted through the hole, the spring-loaded ball 52 springs upward thereby providing a locking mechanism to keep the clip pin 32 from inadvertently being removed from the hole. Other fasteners such as bolts and nuts may be used rather than the clip pin 32.

Figure 3:
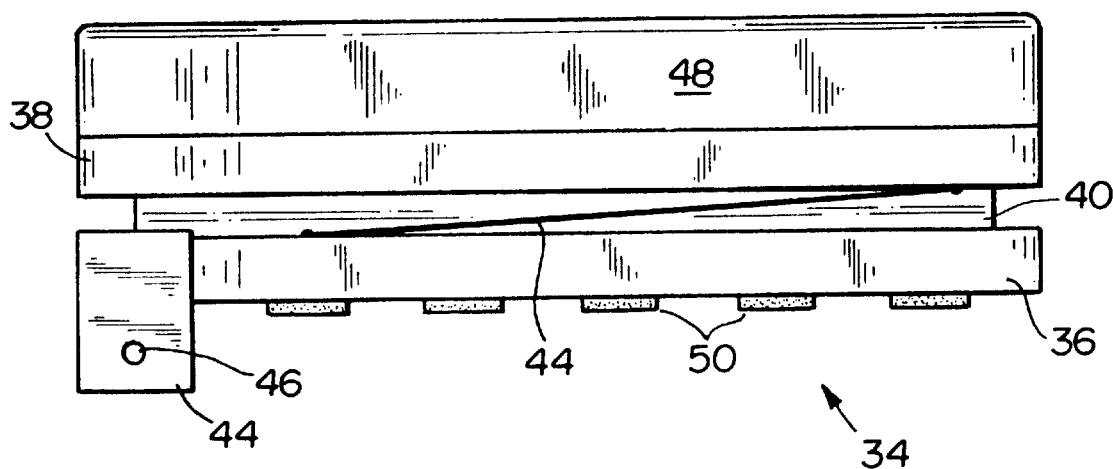
FIG. 3 is a side view of a sliding insert according to the present invention.

FIG. 3 is a side view of the sliding insert 34 of the present invention. The sliding insert includes a bottom portion 36, a top portion 38 and a bearing assembly 40 located between the top and bottom portions 38, 36. The bearing assembly 40 allows the top portion 38 to slide forward relative to the bottom portion 36. At least one holding plate 42 is located at the rear end of the sliding insert 34. The holding plate 42 includes a hole 46 formed therein.

Figure 4:
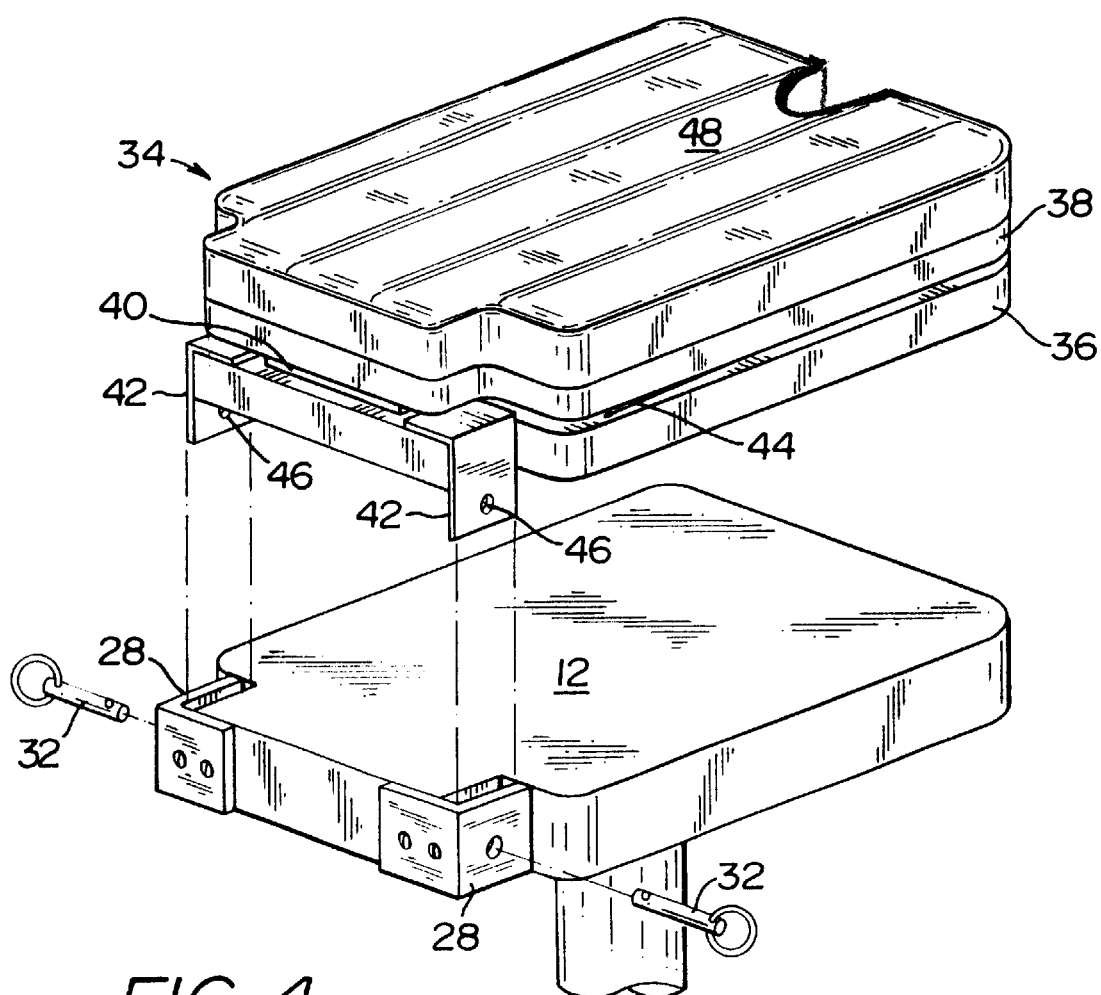
FIG. 4 is a perspective view showing the connection between the sliding insert and the fishing chair.

As shown in FIG. 4, the holding plate 42 attaches the bottom portion 36 of the sliding insert 34 to the seat 12 of the fishing chair 10 by inserting the holding plate 42 into a backrest support 28 located on a rear of the seat 12 of the fishing chair. Preferably, a second holding plate 42 is located on the rear end of the bottom portion 36 of the insert 34. The second holding plate 42 is located on a side of the bottom portion 36 opposite the first holding plate 42. The second holding plate 42 is also inserted into a backrest support 28 and a clip pin 32 or other fastener is used to fasten the holding plates 42 to the backrest supports 28.

Referring to FIG. 3, the sliding insert 34 further comprises a cushion 48 attached to the top portion 38 of the sliding insert 34. The cushion is preferably made of closed cell foam of about 3 inches thickness. The closed cell foam prevents the cushion from taking on water. The cushion 48 may be attached to the top portion 38 by stapling or otherwise. The cover of the cushion 48 may be vinyl, NAUGAHYDE, or another material which is resistant to the marine environment.

The top and bottom portions 38, 36 are preferably made of a durable plastic material which is resistant to the marine environment, for example, polyurethane.

The sliding insert 34 further comprises a retractor 44 attached to opposite ends of the top and bottom portions 38, 36 for automatically returning the top portion 38 from an extended position to a retracted position. The retractor 44 may take a variety of forms. For example, the retractor 44 may comprise an elastic cord (See FIG. 7), such as a bungee cord, with ends attached at opposite ends of the top and bottom portions 38, 36, respectively. In another form, the retractor 44 may be a spring (See FIG. 8) which is similarly attached to opposite ends of the top and bottom portions.

Preferably, the peripheral shapes of the top and bottom portions 38, 36 are substantially the same as the peripheral shape of the seat 12 of the fishing chair 10. The fishing chair 10 is more aesthetically pleasing when the sliding insert 34 has substantially the same contour as the seat 12 of the fishing chair 10.

As shown in FIG. 6, the holding plates 42 may comprise a substantially right angle bracket 58 including arms 60, 62. One arm 60 of the bracket 58 is attached to the bottom portion 36 of the sliding insert by, for example, screws. The second arm 62 of the bracket including a hole 46 for receiving a fastener is configured for insertion into a backrest support 28 attached to the seat 12 of the fishing chair.

As shown in FIG. 9, the bottom surface of the bottom portion 36 may include cushioning pads 50. The cushioning pads 50 help prevent any inadvertent movement of the bottom portion 36 with respect to the seat 12 and also protect the finish of the seat 12. The cushioning pads 50 may be made of, for example, rubber or a synthetic elastic material. The cushioning pads 50 have an adhesive side for attachment to the bottom surface of the bottom portion 36.

FIG. 10 is a top view of the bottom portion 36. The bearing assembly 40 which allows the top portion 38 to slide relative to the bottom portion 36 is a conventional slide, such as Slide Model 8400 manufactured by Knape & Vogt Manufacturing Company of Grand Rapids, Mich. This conventional slide includes a guide rail 68 which is attached to the top surface of the bottom portion 36 of the insert 34. At least two guide rails 68 are needed. However, to ensure smooth sliding and structural stability, more than two guide rails 68 may be used. For example, FIG. 10 shows three guide rails 68 on each side of the bottom portion 36. Space permitting, the number of guide rails 68 may be as many as desired.

FIG. 11 shows the bottom surface of the top portion 38 of the sliding insert 34. A plurality of nested rails 70 are attached to the bottom surface of the top portion 38. As best shown in FIG. 12, the nested rails 70 fit into the guide rails 68 on the top surface of the bottom portion 36. The nested rails 70 slide with respect to the guide rails 68 on ball bearings 72. A ball bearing slide assembly such as the Knape & Vogt system is very dependable under marine conditions.

FIG. 13 shows the sliding insert 34 installed on the chair 10. The sliding insert 34 is shown in an extended position. The broken lines show the sliding insert in the retracted position. The amount of extension of the top portion with respect to the bottom portion may be varied by fixing stops in the slides in a known manner. It has been found that 8 to 10 inches is a reasonable amount of extension.

The backrest 18 of the chair 10 is removed by removing the clip pins 32 from the backrest supports 28 and the backrest plates 30. The insert 34 is then mounted on the chair 10 by sliding the holding plates 42 into the backrest supports 28. The clip pins 32 or other fasteners are then inserted through the holes in the backrest supports 28 and the holes 46 in the holding plates 42. The top portion 38 extends forward by means of the bearing assembly 40 located between the top and bottom portions 36, 38. The top portion 38 will automatically return to its retracted position by action of the retractor 44.

If it is desired to remove the sliding insert 34, the clip pins 32 are removed and the sliding insert 34 is easily lifted off the seat 12 of the chair 10. The backrest 18 may then be reinstalled by inserting the backrest plates 30 into the backrest supports 28 and fastening with the clip pins 32. The installation, use and removal of the sliding insert 34 causes no damage to the fishing chair 10.

While the invention has been described with reference to certain preferred embodiments, numerous modifications, alterations and changes to the described embodiments are possible without departing from the spirit and scope of the invention, as defined in the appended claims and equivalents thereof.

Figure 14:
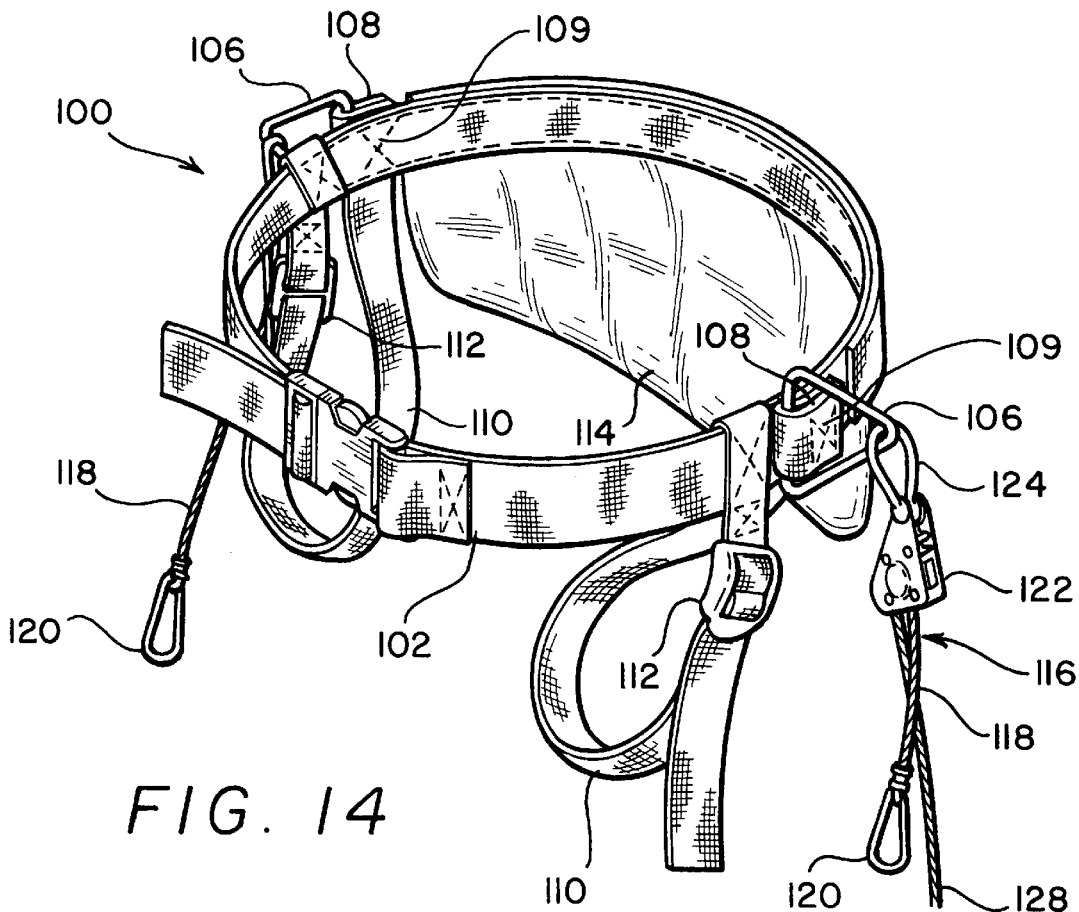
FIG. 14 is a perspective view of a fishing pole support apparatus according to the present invention.

An embodiment of a fishing pole support apparatus 100 is shown in FIG. 14.

The fishing pole support apparatus 100 includes a waist belt 102 provided with a buckle 104 configured to allow the waist belt to be opened and closed. Preferably, the buckle 104 is a snap clip type buckle, which preferably is configured to allow the waist belt to be adjustable in length to accommodate different size users and/or adjusting the tightness of fit of the waist belt 102 around a user. Preferably, the waist belt 102 is made of a woven nylon web material.

The waist belt 102 is provided with a pair of fasteners 106 provided on opposite sides of the waist belt 102. Specifically, the fasteners 106 can be loop-type fasteners (e.g. triangular shaped metal loops made from metal rods bent in triangular shapes with the ends welded together to make structural loops). The metal loops are shown attached to the waist belt by nylon web fabric loops 108 sewn as indicated at 109 to the waist belt 102.

The fishing pole support apparatus 100 is provided with a pair of adjustable length leg belts 110 made of nylon web material. The leg belts 110 are provided with buckles 112 configured to adjust the length of the leg belts 110. Optionally, a storage bag 114 is provided on the back of the waist belt 102. For example, the storage bag can be made of nylon woven fabric provided with a zipper to open and close the storage bag 114.

The fishing pole support apparatus 100 is also provided with a pair of adjustable length fasteners 116. Preferably, each adjustable length fastener 116 is made of rope (e.g. nylon rope) and fitted with a releasable loop fastener 120 at one end and a pulley device 122 having a releasable loop fastener 124 at an opposite end of the rope 118.

The pulley device 122 includes a rachet mechanism 124 to allow a pulley 126 to freely rotate in one direction and lock in an opposite direction. In a preferred embodiment, when a free end 128 of the rope is pulled, the pulley is turned in a direction to shorten the length of the rope 118 while preventing the pulley 126 to rotate in an opposite direction that would lengthen the rope 118. The pulley 126 is provided with angled transverse grooves 130 so that the rope grips the pulley 126 to facilitate rotating the pulley 126 and then the pulley 126 firmly gripping the rope during use. The pulley device 122 is provided with a release mechanism 132 to unlock the rachet mechanism, and allow the pulley 126 to freely rotate in the opposite direction to allow lengthening of the rope 118.

Figure 15A:
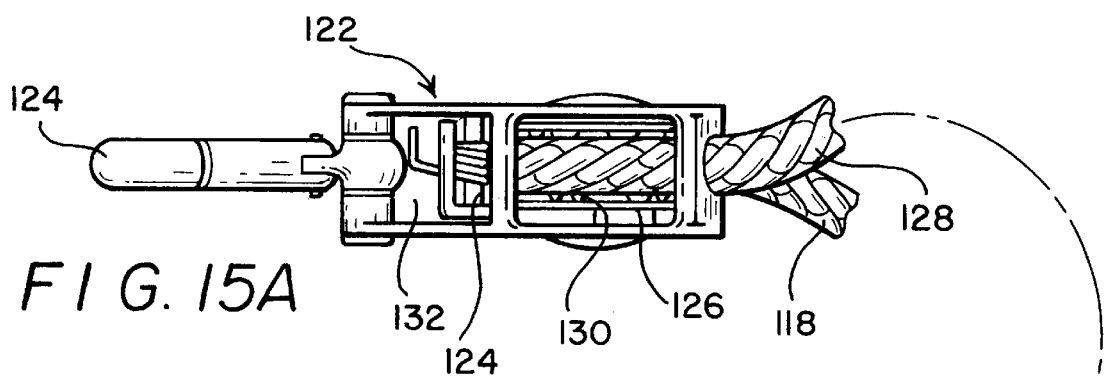
FIG. 15A is a top planar view of a pulley device for use with the fishing pole support apparatus shown in FIG. 14.
Figure 15B:
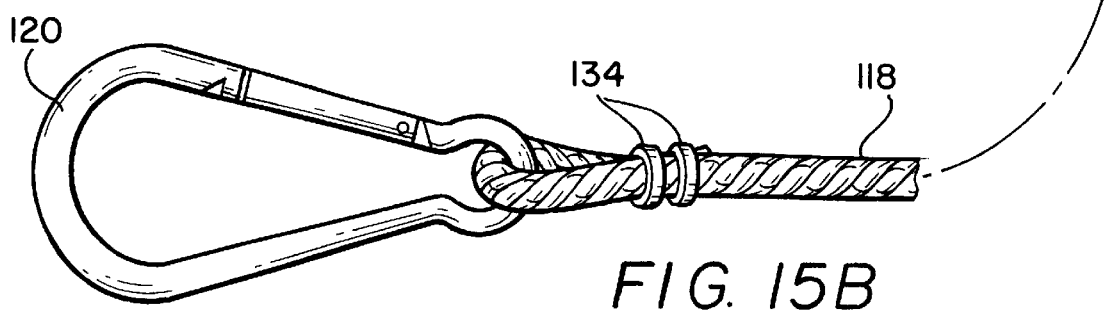
FIG. 15B is a side elevational view of an adjustable loop clip for use with the fishing pole support apparatus shown in FIG. 14.

The loop fastener 120, shown in FIG. 15, is connected to the one end of the rope 118 by looping the end of the rope 118 over and connecting the free end to the other portion of the rope 118 with metal fasteners 134, which are crimped tightly onto the portions of rope.

Figure 16:
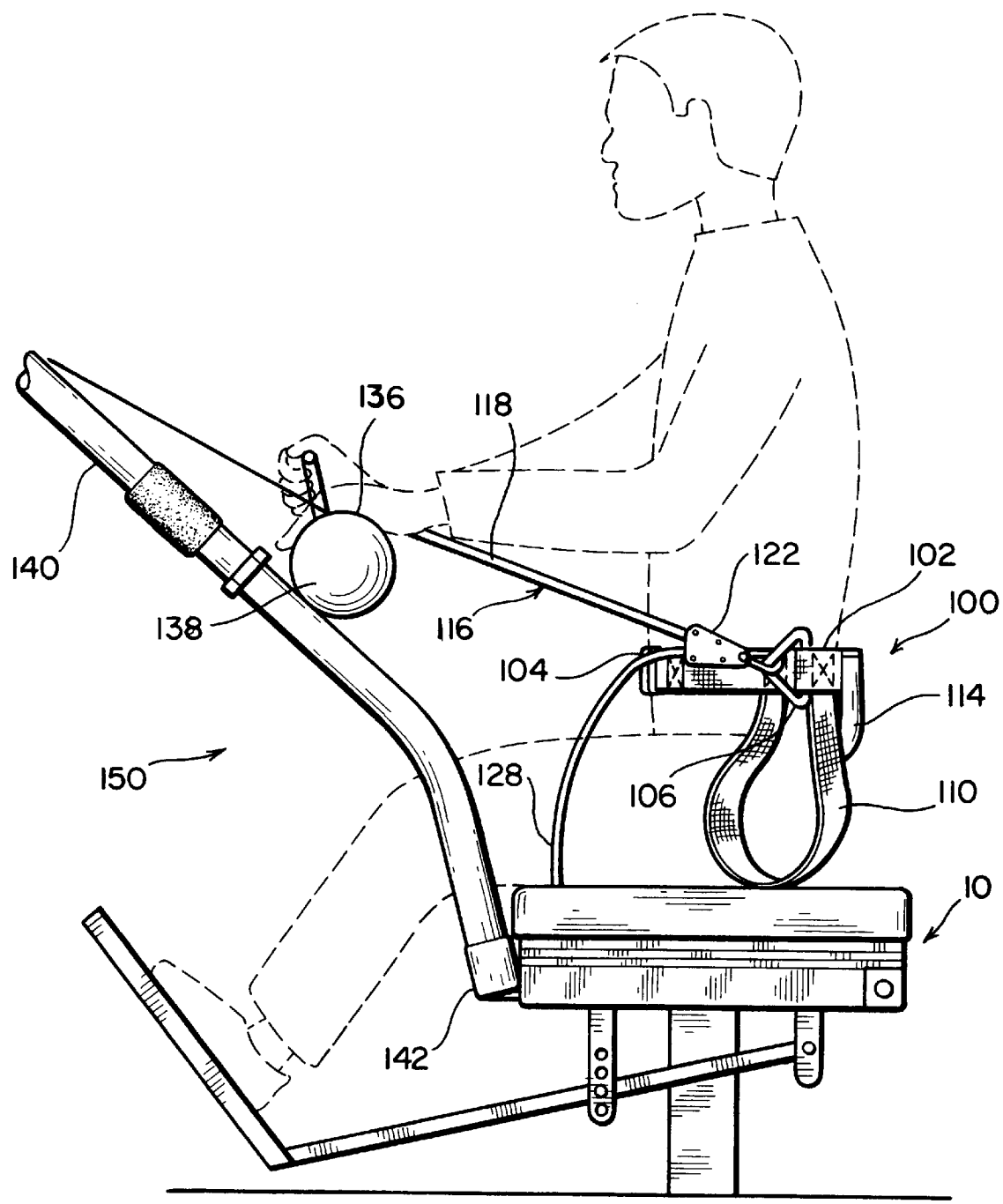
FIG. 16 is a side elevational view showing a user connected to a reel of a fishing pole and the fishing pole connected to a seat of an apparatus according to the present invention.

As shown in FIG. 16, the fishing pole support apparatus 110 is fitted on the waist of a user. The adjustable length fastener 116 is connected to eyelets 136 of the fishing reel 138 connected to fishing pole 140. A lower end of the fishing pole 140 is connected to the fishing chair 110 by fastening device 142. Preferably, the fastening device 142 is a swivel type fastening device. The combination defines a fishing pole harness/chair support apparatus 150 connecting the user to the fishing pole 140 and fishing chair 10.

Figure 17:
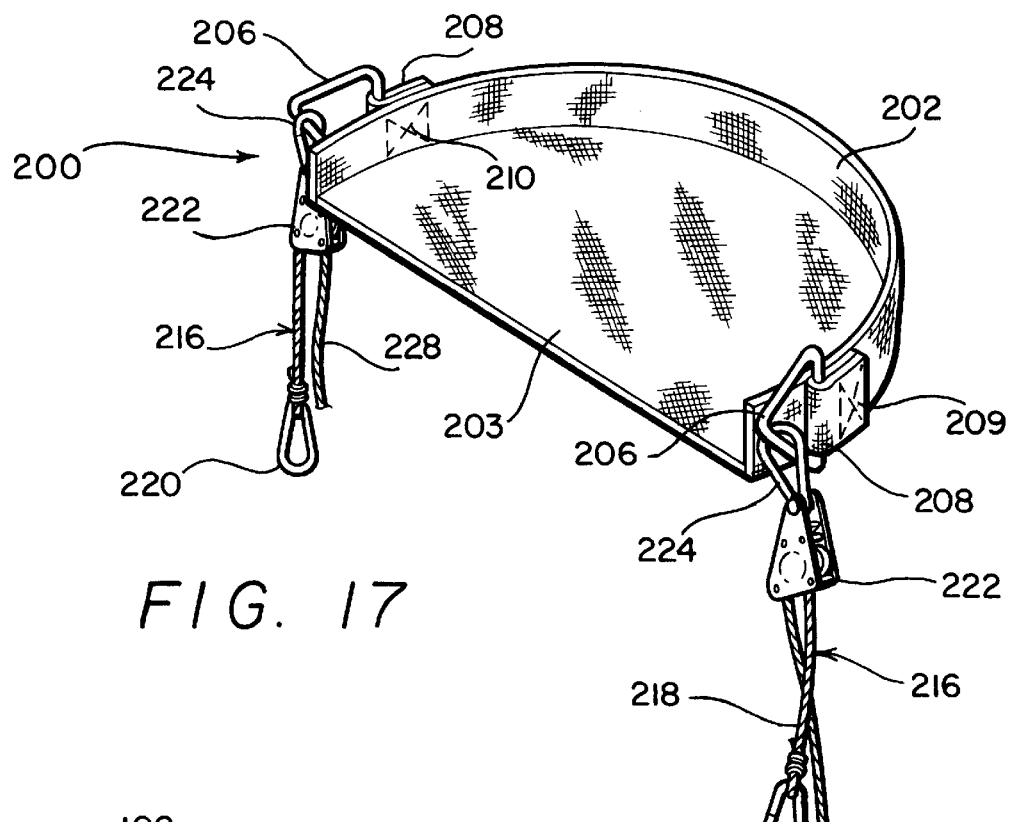
FIG. 17 is a perspective view of another embodiment of a fishing pole support apparatus according to the present invention.

Another embodiment of the fishing pole support apparatus 200 according to the present invention is shown in FIG. 17. A belt portion 202 is connected to a seat portion 203. Preferably, the belt portion 202 is made of nylon web material and the seat portion 203 is made of nylon knitted fabric sewn to the belt portion 202. A pair of fasteners 206 are provided on opposite sides of the support apparatus 200, the same as or similar to the fasteners 106 in the embodiment shown in FIG. 14, and connected in a manner to pivot. Further, the support apparatus 200 is provided with a pair of pulley devices 222, the same or similar to the pulley devices 122 in the embodiment shown in FIG. 14.

Figure 18:
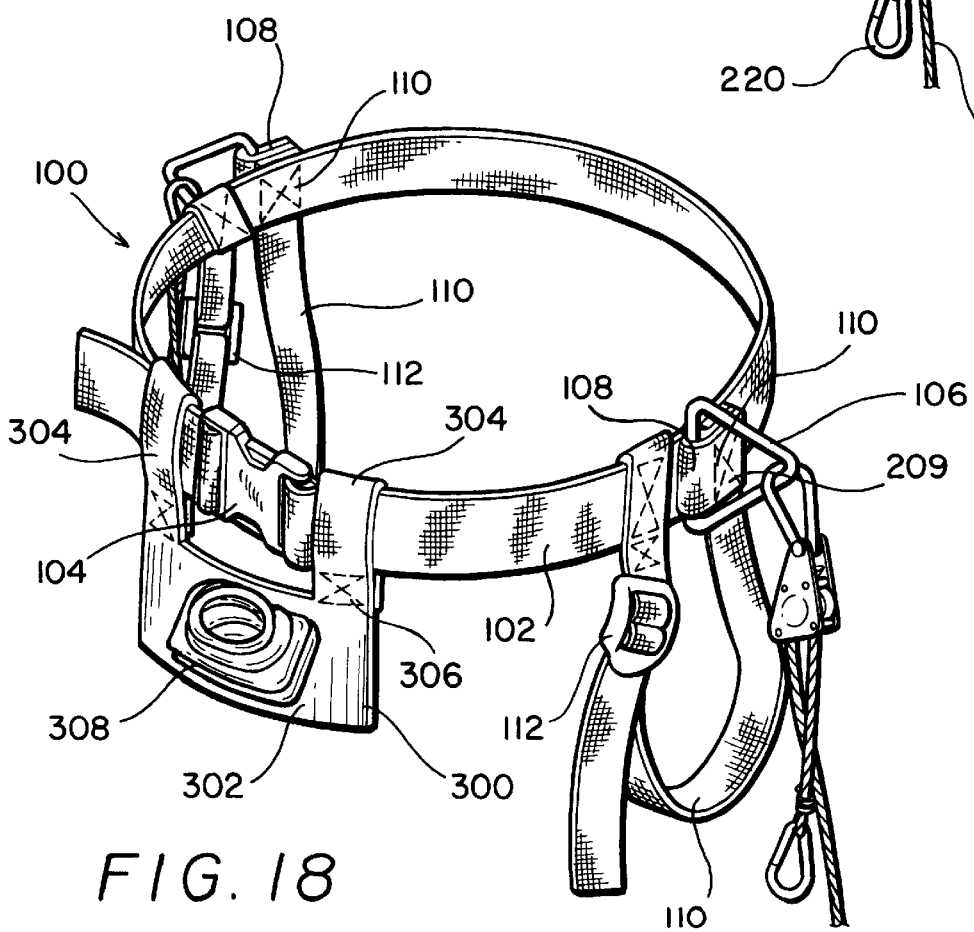
FIG. 18 is a perspective view of a fishing pole support apparatus according to the present invention provided with the accessory of a fishing pole support base allowing pivotal movement between the fishing pole and the user.

The fishing pole support apparatus 100 can be provided with an accessory defined by a fishing pole fastening device 300, shown in FIG. 18. The fastening device 300 includes a panel 302 (e.g. substantial rigid fiberglass plate) provided with a pair of spaced apart belt type loop fasteners 304 for connecting the fastening device 300 to the waist belt 102. The panel 302 and loop fasteners 304 can all be made of nylon web material sewn together as indicated at 306. The fastening device 300 is provided with a swivel type fishing pole connection device 308. The device 308 allows the fishing pole to pivot to adjust the angle of the fishing pole relative to the body of the user.

What is claimed is:

1. A fishing pole support apparatus configured for connecting a fishing pole to a user for supporting and controlling the fishing pole, said apparatus comprising:

a waist belt configured to fit around a waist of the user;

a pair of first fasteners connected on opposite sides of said waist belt;

a pair of leg belts connected to opposite sides of said waist belt, said leg belts each configured to fit around an upper portion of each leg of the user; and a pair of adjustable length second fasteners each connected to a respective said first fasteners, said adjustable length second fasteners configured to be releasably connected to the fishing pole, said adjustable length second fasteners are each defined by a rope provided with a releasable clip at one end and a pulley device having a releasable clip provided at an opposite end of said rope.

2. An apparatus according to claim 1, wherein said second fasteners are configured to be connected to a reel of said fishing pole.

3. An apparatus according to claim 2, including a fishing pole fastening device connected to said waist belt.

4. An apparatus according to claim 3, wherein said fastening device includes a swivel bracket configured to allow the fishing pole to be adjustable in angle relative to a user's body.

5. An apparatus according to claim 4, wherein said fastening device includes a panel including a pair of belt fasteners looped around a front portion of said waist belt for connecting said fastening device to said waist belt.

6. An apparatus according to claim 5, wherein said waist belt is provided with a buckle configured to open and close said waist belt, said buckle is provided on a front side of said waist belt and said belt fasteners are set apart to provide space for accessing said buckle.

7. An apparatus according to claim 1, including a fishing pole fastening device connected to said waist belt.

8. An apparatus according to claim 7, wherein said fastening device includes a swivel bracket configured to allow the fishing pole to be adjustable in angle relative to a user's body.

9. An apparatus according to claim 8, wherein said fastening device includes a panel including a pair of belt fasteners looped around a front portion of said waist belt for connecting said fastening device to said waist belt.

10. An apparatus according to claim 1, wherein said waist belt is provided with a buckle configured to open and close said waist belt.

11. An apparatus according to claim 10, wherein said waist belt is configured to be adjustable in length.

12. An apparatus according to claim 1, wherein said waist belt is configured to be adjustable in length.

13. An apparatus according to claim 1, wherein said first pair of fasteners are defined by a pair of loop fasteners.

14. An apparatus according to claim 13, wherein said loop fasteners are configured to swivel relative to said waist belt.

15. An apparatus according to claim 1, wherein said leg belts are configured to be adjustable in length.

16. An apparatus according to claim 1, wherein said pulley device is provided with a rachet mechanism configured to allow a pulley of said pulley device to freely turn in one direction, and lock in an opposite direction, when one of said adjustable length second fasteners is shortened in length by the user pulling on a free end of said rope extending from said pulley, and said pulley device provided with a release configured to lengthen said second fastener by releasing said pulley to freely turn in said opposite direction when said release is operated by the user.

17. An apparatus according to claim 1, including a storage pouch connected to a back end of said waist belt.

18. An apparatus according to claim 1, including a fishing chair configured for the user to sit in said fishing chair, said fishing chair including a fastening device for connecting the fishing pole to said fishing chair.

19. A fishing pole support apparatus configured for connecting a fishing pole to a user for supporting and controlling the fishing pole, said apparatus comprising:

a harness device configured to connect with a body portion of the user;

a pair of first fasteners connected on opposite sides of said harness device; and a pair of adjustable length second fasteners each connected to a respective said first fasteners, said adjustable length second fasteners configured to be releasably connected to the fishing pole, said adjustable length second fasteners are each defined by a rope provided with a releasable clip at one end and a pulley device having a releasable clip provided at an opposite end of said rope.

20. An apparatus according to claim 19, wherein said harness device includes a waist belt and a pair of leg belts connected to opposite sides of said waist belt, said leg belts each configured to fit around an upper portion of each leg of the user.

21. An apparatus according to claim 19, wherein said harness device includes a belt portion adapted to be connected to a seat portion.

22. An apparatus according to claim 19, including a fishing chair configured for the user to sit in said fishing chair, said fishing chair including a fastening device for connecting the fishing pole to said fishing chair.

* * * * *